Jan. 13, 1959 G. R. BREWER 2,869,022

TRAVELING-WAVE TUBE GAIN CONTROL

Filed Nov. 22, 1954 2 Sheets-Sheet 1

INVENTOR
GEORGE R. BREWER,
BY
Henry Heyman
ATTORNEY.

INVENTOR.
GEORGE R. BREWER.
BY
Henry Heyman
ATTORNEY.

United States Patent Office 2,869,022
Patented Jan. 13, 1959

2,869,022

TRAVELING-WAVE TUBE GAIN CONTROL

George R. Brewer, Palos Verdes Estates, Calif., assignor to Hughes Aircraft Company, Culver City, Calif., a corporation of Delaware Application November 22, 1954, Serial No. 470,205

6 Claims. (Cl. 315—3.6)

This invention relates to microwave tubes and more particularly to means for controlling the gain of electron-stream type or traveling-wave tubes.

Traveling-wave tubes produce moderate signal gain over a large band of frequencies. They are presently employed as amplifiers and oscillators; however, in a number of applications they could be profitably employed as modulators. It is also desirable to provide a method for automatically and electronically controlling the gain of a traveling-wave tube amplifier. One gain control method, which has been used in an attempt to accomplish amplitude modulation or automatic gain control, involves the modulation or regulation of the direct-current potential of the helical conductor employed in a traveling-wave tube to propagate electromagnetic waves. Changes in the helix voltage, however, were found to introduce so much phase modulation or to produce such deleterious phase changes of the signal that both amplitude and frequency or phase modulation are present and hence this gain control method has been generally abandoned.

It is therefore an object of the invention to provide means for effectively controlling traveling-wave tube gain without the introduction of phase modulation.

It is another object of the invention to provide a traveling-wave tube amplitude modulator which does not introduce phase or frequency modulation.

It is a further object of the invention to provide a traveling-wave tube amplifier with associated circuitry for electronically and automatically controlling the gain of the tube.

According to the present invention, the direct-current voltage of a conductive helix which extends over only a relatively short distance along the wave transmission path of a traveling-wave tube, is modulated or controlled. The present invention more particularly includes the use of two separate helices, i. e. a relatively short input helix and a relatively long principal helix; the helices being maintained at different average direct-current potentials. The potential of the input helix is varied in accordance with the amplitude of a control voltage. The control voltage employed may be a modulating signal or a varying direct-current signal which may be derived from the envelope of the radio-frequency signal at the output of the tube. The tube may thus be employed as a modulator or as an amplifier with automatic gain control in which a feedback path is used to control the input helix voltage.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 9:
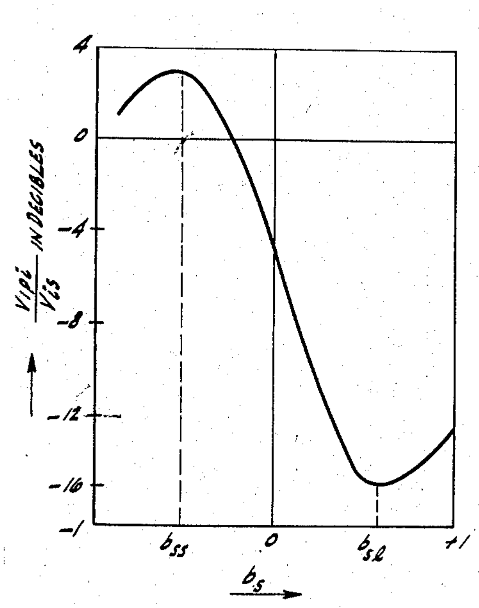
Figure 8:
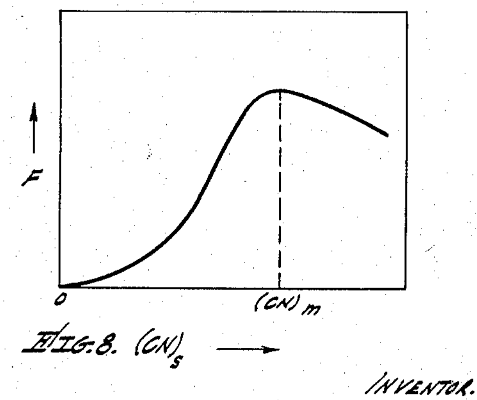

Figs. 4, 5, 6, and 7 are vector diagrams showing voltage relationships occurring in the operation of a traveling-wave tube; and Figs. 8 and 9 are curves suitable for the design of a traveling-wave tube in accordance with the present invention.

Figure 1:
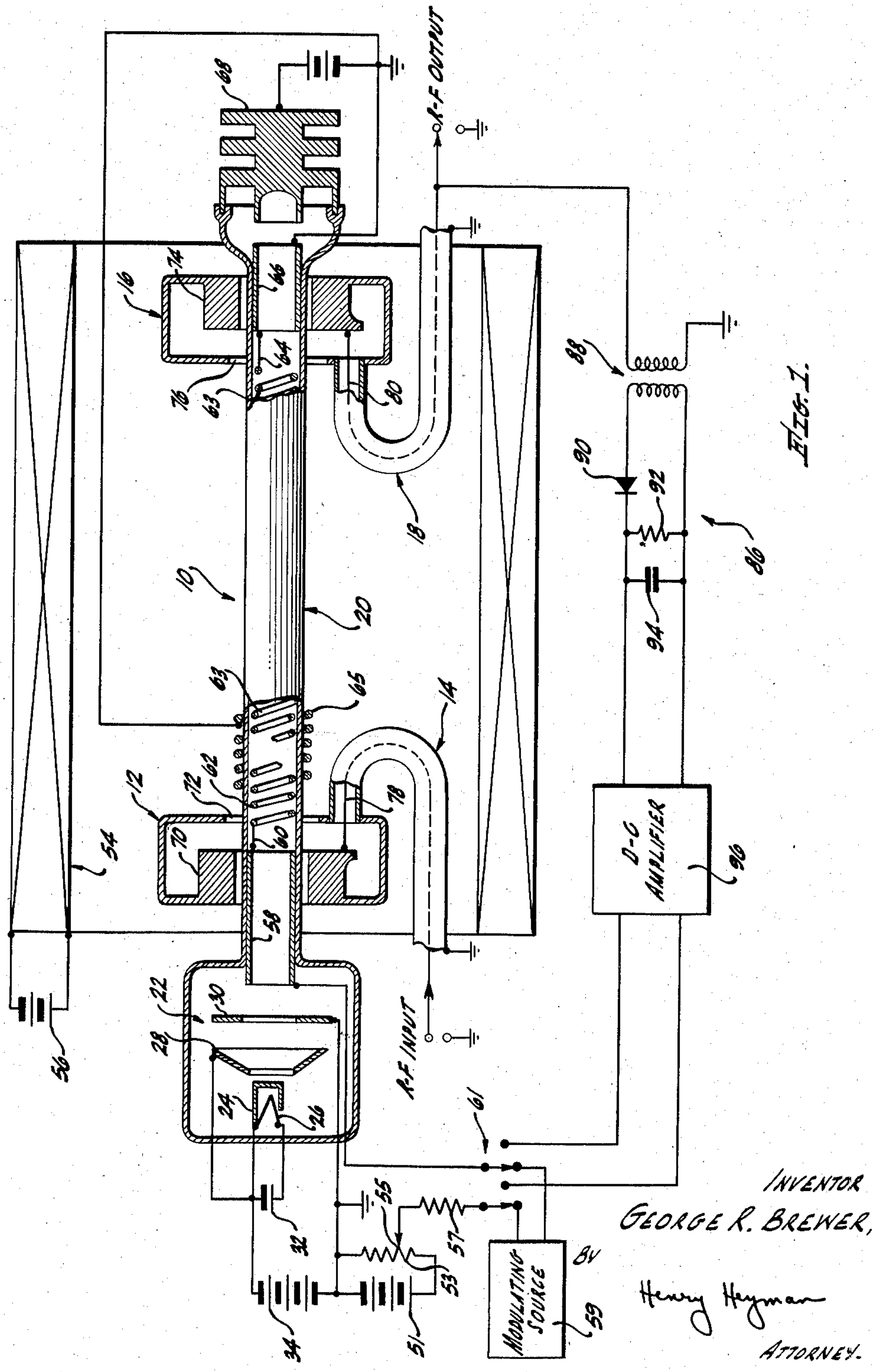
Fig. 1 is a diagrammatic sectional view of an embodiment of the invention with associated circuitry.

Referring now to the drawings, there is shown in Fig. 1 an embodiment of the microwave modulator of the invention which comprises a traveling-wave tube 10 including an input matching cavity 12 having a coaxial input cable 14 connected thereto and an output matching cavity 16 connected to a coaxial output cable 18. An envelope 20, which provides the evacuated chamber of traveling-wave tube 10, consists of a long cylindrical structure which has an enlarged portion at the left extremity as illustrated in Fig. 1. Within the enlarged portion at the left extremity, there is located an electron gun 22 for developing an electron stream. Gun 22 comprises a cathode 24 with a heater 26, a focusing electrode 28 and an accelerating anode 30. Heater 26 is connected across a source of potential, such as battery 32, the negative side of heater 26 being connected to cathode 24. Cathode 24 is maintained at a potential considerably below ground by a source 34 having its positive terminal grounded. A voltage of the order of 1000 volts with respect to ground is representative of the voltage normally impressed upon cathode 24 by source 34. Focusing electrode 28, which is connected to the negative terminal of battery 32, may have a frustro-conical internal surface of revolution disposed at an angle of 67½ degrees from its axis of symmetry. Anode 30 is connected to ground.

A solenoid 54 is axially positioned symmetrically about the envelope 20. An appropriate direct current is maintained in solenoid 54 by means of a potential source, such as a battery 56, so as to produce an axial magnetic field of the order of 1000 gauss to constrain the electron stream produced by gun 22.

Proceeding along from the electron gun 22 in the direction of electron flow, there are positioned successively about the path of the electron stream, a matching input ferrule 58 connected by an input antenna lead 60 to an input helix 62, a principal helix 63 which is, in turn, connected by an output antenna-lead 64 to a matching output ferrule 66, and a collector electrode 68 which is positioned at the end of the path so as to collect the stream electrons. Electromagnetic wave energy is coupled from input helix 62 to principal helix 63 by means of a coupling helix 65 which is disposed about the adjacent ends of input and principal helices 62 and 63. Coupling helix 65, however, has a pitch angle negative with respect to but equal in magnitude to that of input and principal helices 62 and 63 to provide the desired coupling and may be spaced about envelope 20 as shown. What is meant by a negative pitch angle is that the coupling helix has opposite screw sense to that of input and principal helices 62 and 63.

All of the helices, which serve as the slow-wave circuit for the traveling-wave tube 10, preferably are made of a material such as tungsten or molybdenum, the principal requirement being that they retain their form, especially with respect to the ratio of their pitches to their diameters. In accordance with the present invention, principal and coupling helices 63 and 65 are maintained at a suitable fixed potential which may be ground. Coupling helix 65 is connected directly to ground whereas principal helix 63 is connected to ground through output antenna-lead 64 and output ferrule 66. Alternatively, coupling helix 65 may be maintained at the same potential as that of input helix 62, or at a certain potential below that of input helix 62 or at a fixed potential above ground. Input helix 62 may be maintained at a variable potential, different from ground, by a connection from input ferrule 58 through a double-pole, double-throw switch 61, a modulating source 59, and a series resistor 57 to a tap 55 on a voltage divider 53. Voltage divider 53 is connected across a source 51, the negative terminal of which is connected to ground. The quiescent potential of input helix 62 may thus be adjusted by changing the position of the tap 55 on voltage divider 53.

As previously mentioned, input and principal helices 62 and 63 are connected to ferrules 58 and 66 by leads 60 and 64, respectively. Leads 60 and 64 are located parallel to the electric fields excited within matching cavities 12 and 16. Matching cavity 12 has the configuration of a rectangular toroid with a concentric collar 70 disposed about and spaced from matching ferrule 58. An opening 72 in the end plate of cavity 12 facing the left end of input helix 62 allows the full length of lead 60 to be energized and, in addition, decreases the tendency of the electric field produced by the potential on the cavity from disturbing the flow of electrons in the stream. Cavity 16 is similarly constructed, having a corresponding concentric collar 74 arranged about and spaced from matching ferrule 66 and an opening 76 facing the right end of principal helix 63.

The center conductor 78 of coaxial input cable 14 extends through an aperture in the annular wall of cavity 12 and is connected to concentric collar 70 while the outer conductor of cable 14 is bonded to the periphery of the aperture. Likewise, the center conductor 80 of coaxial output cable 18 extends through an aperture in the annular wall of cavity 16 and is connected to concentric collar 74 while the outer conductor of cable 18 is bonded to the periphery of the aperture in the same manner as before or vice-versa. Cavities 12 and 16 are fabricated with an inner surface composed of highly conductive material and are broadly resonant so as not to limit the frequency of operation. The configuration shown and described for the cavities 12 and 16 in the drawing, provides suitable impedance matching from input and principal helices 62 and 63 to coaxial cables 14 and 18, respectively, over a range of frequencies such as, for example, from 2000 to 4000 megacycles per second.

The stream electrons are intercepted by collector 68 at the opposite extremity of envelope 20 with respect to electron gun 22. Collector 68 is sealed to envelope 20 so as to have a large surface external to the evacuated chamber for heat dissipation purposes and is provided with fins to aid in conducting away the heat that is dissipated by the stream electrons when collected. Accordingly, collector 68 is preferably fabricated from a metal having good electrical and heat conducting properties such as, for example, copper. A potential of the order of 200 volts positive with respect to ground may be applied to collector 68 in order to prevent secondary electrons which may be produced by the stream electrons impinging on its surface from reaching principal helix 63 or ferrule 66. This potential is applied by means of a connection from collector 68 to the positive terminal of a source 84, the negative terminal of which is grounded.

In the operation of the tube 10, an input signal to be amplified is applied by input terminals through coaxial input cable 14 to input cavity 12. The input wave in flowing along the exposed portion of conductor 78 within cavity 12 excites an electromagnetic field within that cavity. This field induces a corresponding current in antenna-lead 60 connecting input ferrule 58 to input helix 62 to launch a traveling wave along the input helix 62. Interaction between the electron stream and the traveling wave results in transfer of energy from the stream to the wave causing it to be modulated in amplitude and velocity. The signal gain of the wave is then substantially inversely proportional to the magnitude of the electron stream velocity. Since the stream velocity is modulated with source 59, by modulating the voltage of input ferrule 58 and input helix 62, amplitude modulation of the wave occurs; however, some phase or frequency modulation incidentally occurs which is also proportional to the stream velocity modulation. This phase modulation, in addition, is roughly proportional to the ratio of the length of input helix 62 to that of principal helix 63. Since input helix 62 is made considerably shorter than principal helix 63, the phase modulation, accompanying the amplitude modulation in accordance with the invention, is favorably small.

At the left end of principal helix 63 the traveling-wave energy is coupled from input helix 62 to principal helix 63 by coupling helix 65 thereby insuring the continuity of the wave on the helix and the useful gain of the tube is produced along principal helix 63. At the end of principal helix 63, the amplified electromagnetic wave, in flowing along output antenna-lead 64 connecting output helix 63 to output ferrule 66, excites an electric field in cavity 16. This electric field induces a corresponding output signal on center conductor 80 of coaxial cable 18. This output signal then has substantially no phase modulation which is normally incident to the conventional stream-velocity modulation type of amplitude modulation.

The tube 10 may operate as an amplifier with automatic gain control simply by changing the position of switch 61 to the right, as viewed in the drawing, whereby a conventional feedback path 86 is connected in series with input ferrule 58, resistor 57, and through voltage divider 53 to ground in lieu of modulating source 59. The path 86 comprises an input transformer 88 which is connected to the center conductor 80 of the output coaxial cable 18. Connected to the output winding of transformer 88 is a rectifier 90, a load resistor 92, a filter capacitor 94 and a direct-current amplifier 96. A portion of the rectified direct-current voltage proportional to the average signal amplitude at the output end of the tube 10 is thus fed back to input ferrule 58 through direct-current amplifier 96. The portion of the direct-current voltage is proportional to the time constant of the parallel resistance and capacitance provided by load resistor 92 and filter capacitor 94. The rectifier 90 is connected with an appropriate polarity to cause the potential of input ferrule 58 and therefore input helix 62 to vary with the amplitude of the output signal of the traveling-wave tube 10. This is done because the amplitude of the output signal is inversely proportional to the potential of the input helix 62.

Figure 2:
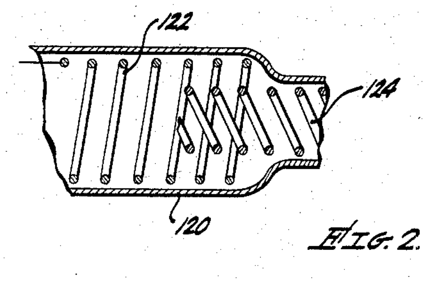
Fig. 2 is a broken section of a traveling-wave tube in which a second embodiment of the invention is illustrated.

Wave energy may be coupled from the isolated input helix 62 to the principal helix 63 in a number of ways. For example, in Fig. 2 a broken section of an evacuated envelope 120 is illustrated housing an input helix 122 which is disposed about a principal helix 124. The envelope 120 is contracted at its right end whereby it is disposed contiguously about both helices 120 and 124. Input helix 122 may be disposed contiguous to a portion of principal helix 124 to provide optimum electromagnetic coupling. Both of the helices 122 and 124 may then be appropriately tapered at their mutual coupling ends. It is to be noted that input helix 122 has a negative pitch with respect to principal helix 124.

The principal requirement in coupling wave energy in this manner is that all helices must propagate waves of frequencies within the operating band at substantially the same velocity. The propagation velocity $v_p$ is given approximately by $$v_p = c \sin |P| \qquad (1)$$

where $c$ is the velocity of light or $3 \times 10^8$ meters per second and P is the pitch angle of the helix, $|P|$ being the absolute magnitude of the pitch angle. The pitch angles of helices 122 and 124 should therefore be approximately equal in absolute magnitude but may be opposite in sign.

A helix is not, of course, the only type of slow-wave structure which may be used with the tube of the present invention. Numerous other types, such as a disc-loaded waveguide, are illustrated in chapter IV in "Traveling-Wave Tubes," by J. R. Pierce, D. Van Nostrand and Co., Inc., New York, 1950. An input section and a principal section of a slow-wave structure there illustrated may be insulated from each other, e. g. with a dielectric ring. In that case means for maintaining the sections at different direct-current potentials and means for coupling electromagnetic energy from one section to the other should be provided in accordance with the present invention.

In order to better understand the operation of the present invention and to understand some of the more detailed but preferred design approaches, it is desirable to review the generally accepted theory explaining the operation of a traveling-wave tube. The meter-kilogram-second and volt-ampere system of units is followed through the following discussion. The propagation constants of the waves of interest are expressed by means of an equation called the determinantal equation found in "Traveling-Wave Tubes," by J. R. Pierce, D. Van Nostrand and Co., Inc., New York, 1950, which is as follows:

$$1=\frac{jI_oW_eR}{2V_o(jW_e-R^2)}\left[\frac{RR_1K}{2(R_1^2-R^2)}-\frac{jR}{wC_1}\right] \qquad (2)$$

where $I_o$ is the direct current of the electron stream;
$w=2\pi f$, $f$ being the frequency of the launched wave and $\pi$ being 3.1416;
$W_e$ is the electronic wave number, viz., $$\frac{w}{u_o}$$

$u_o$ being the direct-current stream velocity;
$V_o$ is the voltage by which the stream electrons are accelerated to give them a velocity $u_o$,
$u_o=(2nV_o)^{1/2}$ where $n=1.759\times10^{11}$ coulomb/kilogram;
$R_1$ is the propagation constant of the wave on the helix in the absence of the electron stream;
$C_1$ is the stream-to-helix distributed spatial shunt capacitance;
R is a vector quantity defining the propagation constants of the three forward waves and the one backward wave associated with stream and traveling-wave interaction;
K is a helix characteristic impedance; and
$j=(1)^{1/2}$.

Because of the complexity of the equation it has been found to be desirable to choose a new variable $q$ and to lump the constants of the equation into parameters QC, C, $b$ and $d$, defined as follows:

$$QC=\frac{W_e}{wc_1}\left[\frac{I_o}{8V_oK^2}\right]^{1/3} \qquad (3)$$

$$C=\left[\frac{KI_o}{8V_o}\right]^{1/3} \qquad (4)$$

$$-jR=W_e(1+jCq) \qquad (5)$$

$$-jR_1=W_e(1+cb-jCd) \qquad (6)$$

Substituting Equations 2, 3, 4 and 5 into Equation 1, the following expression is obtained:

$$\left(q+\frac{j(4QC)^{1/2}}{1-(4QC^3)^{1/2}}\right)\left(q-\frac{j(4QC)^{1/2}}{1+(4QC^3)^{1/2}}\right)(q+jb+d)\left(q-jb-d-\frac{2j}{C}\right)=(q-j/C)^2\frac{2C(1+Cb-jCd)}{1-4QC^3} \qquad (7)$$

Equation 7 is still too complicated to solve efficiently explicitly for the roots of $q$, but it may be studied in relationship to the four parameters, viz. QC, called the space charge parameter; C, called the gain parameter; $d$, called the helix loss parameter; and $b$, called the velocity parameter.

$b$ is called the velocity parameter because by definition $$b\equiv\frac{u_o-v_1}{Cv_1} \qquad (8)$$

where $v_1$ is the phase velocity of the propagated wave in the absence of the electron stream. Since $u_o=(2nV_o)^{1/2}$, it is apparent that $b$ is likewise a function of the direct-current helix voltage, $V_o$, i. e. $b$ is determined by the helix D.-C. voltage adjustment.

$q_1$, as one root of Equation 7, is defined as the propagation constant of the growing wave where $q_1=x_1+jy_1$. The magnitude of the real part of $q_1$, i. e. $x_1$, then determines the rate of growth of the growing wave, the decibel gain of a traveling-wave tube being commonly expressed as $$G=A+BCN \qquad (9)$$

where
A is the loss factor;
$B=54.6\ x_1$; and
$N=\frac{W_el}{2\pi}$, where $l$ is the helix length.

The electronic wavelength $t_e$ is defined as $$t_e=\frac{2\pi}{W_e}$$

Figure 3:
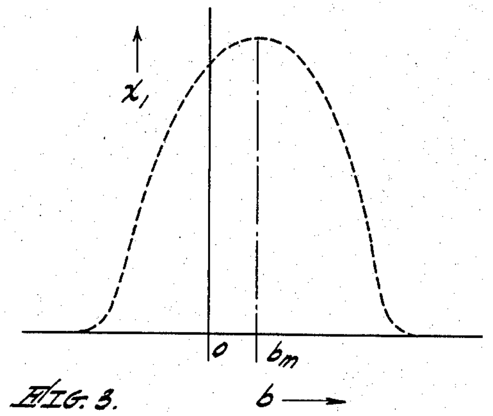
Fig. 3 is a graph of a traveling-wave tube operating characteristic curve.

For a helix several electronic wavelengths long, A is generally smaller than BCN, e. g. by a factor of five or more. Maximum gain is, therefore, achieved at a value of $b$ which makes $x_1$ a maximum for given values of QC, C and $d$. Due to the complexity of Equation 7, practical values were assigned to QC, C and $d$, and $x_1$ has been plotted as a function of $b$ in Fig. 3. It is seen that $x_1$ becomes a maximum at $b_m$. Maximum gain is actually achieved at a value of $b$ which differs from $b_m$ by only a few percent. It is then evident that it is desirable to operate the travel-wave tube 10 of Fig. 1 in a manner such that the potential of principal helix 63 is suitable to produce the relationship $b_p\simeq b_m$ for the same values of QC, C and $d$, where $b_p$ is the value of $b$ for the principal helix 63.

To complete the design of the traveling-wave tube 10 only two factors remain undetermined, viz. the length of input helix 62 and the direct-current voltage range over which input helix 62 should be operated. What is actually desired is an optimum length and range. In order to obtain this information it is necessary to examine the physical operation of the tube 10. When a signal having a voltage $V_s$ is impressed upon the input antenna-lead 60, the signal voltage divides into the three forward waves having voltages $V_{1s}$, $V_{2s}$ and $V_{3s}$. Each of the forward wave voltages varies with distance as $$\epsilon^{-jW_e(1+jC_sq_{ns})Z_s} \qquad (10)$$

where $n=1, 2, 3$, as a subscript denotes the propagation constants, $q_{1s}$, $q_{2s}$ and $q_{3s}$ of each of the waves propagated along the input helix 62;
$\epsilon=2.71828$;
$Z_s$ is the distance from the input end of the input helix 62; and
$C_s$ is the gain parameter of input helix 62.

Figure 4:
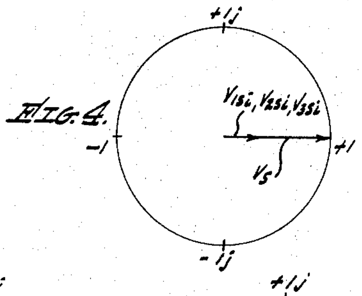
Figure 5:
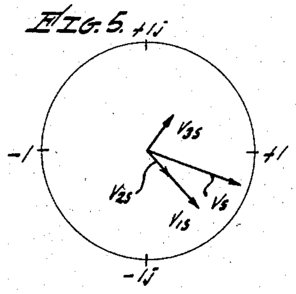

The three waves traveling down the input helix 62 will interact and interfere with each other so long as their relative amplitudes are comparable. Eventually the growing wave will reach such an amplitude that the others may be considered negligible. This is apparent from the vector diagrams of $V_s$, $V_{1s}$, $V_{2s}$, $V_{3s}$ in Figs. 4, 5, 6 and 7. In Fig. 4 where $Z_s=0$, i. e. at the left end of the input helix 62, $V_{1s}\equiv V_{1si}$, $V_{2s}\equiv V_{2si}$, $V_{3s}\equiv V_{3si}$ and $V_s \equiv V_{si}$. The waves are then approximately of equal amplitude, i. e.

$$V_{1si} = V_{2si} = V_{3si} = \frac{V_{si}}{3}$$

where $$Z_s = \frac{\pi}{4W_eC_s}$$

as shown in Fig. 5, the amplitude of the total voltage, $V_s$, is given by $V_s = V_{1s} + V_{2s} + V_{3s}$. $V_s$ is shown to have decreased from $V_{si}$ due to the interference effects which exist for a certain distance until about $$Z_s \simeq \frac{0.6\pi}{W_eC_s}$$

Figures 6, 7:
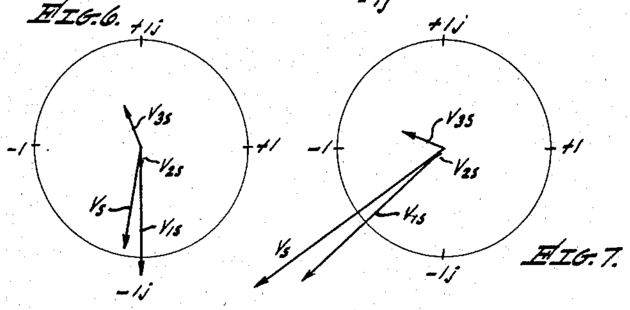

After this point is reached $V_{1s}$ dominates. It is seen in Figs. 6 and 7, where $Z_s$ increases, i. e. where $$Z_s = \frac{\pi}{2W_eC_s}$$

and $$Z_s = \frac{3\pi}{4W_eC_s}$$

respectively, that there is less and less difference between $V_{1s}$ and $V_s$.

A change in the direct-current voltage of input helix 62 will change the electron velocity therein, $u_{so}$, and thus the parameter $b_s$ which is the $b$ of the input helix 62. Such a change in $b_s$ indicates that a different set of values of $q_{ns}$ are appropriate. The total voltage in the input helix 62, $V_s$, can thus be varied in phase and amplitude by changing $b_s$.

Assuming that input helix 62 is severed after a certain distance, $Z_s = (CN)_s$, and is coupled to principal helix 63, the total voltage at the output end of the input helix, which is substantially equal to the total voltage at the input end of the principal helix, $V_{so}$, will then redivide into three new voltages, $V_{1p}$, $V_{2p}$ and $V_{3p}$. $V_{1p}$ is the voltage associated with the growing wave, and it is the voltage which is of primary interest. The magnitude of the output signal of the traveling-wave tube 10 will then vary with the magnitude of the growing wave voltage at the input end of the principal helix 63 or $V_{1pi}$. It is given by the relationship.

$$V_{1pi} = \frac{[V_{so} - (q_{2p}+q_{3p})(ju_{po}C_p/n)\,v + q_{2p}q_{3p}(-2V_{po}C_p^2I_o)\,i]}{\left(1-\frac{q_{2p}}{q_{1p}}\right)\left(1-\frac{q_{3p}}{q_{1p}}\right)} \quad (11)$$

where $q^1_p$, $q_{2p}$ and $q_{3p}$ are the new propagation constants of the waves $V_{1p}$, $V_{2p}$ and $V_{3p}$ in the principal helix 63;
$u_{po}$ is the electron stream velocity within the principal helix 63;
$C_p$ is the gain parameter of the principal helix 63;
$V_{po}$ is the direct-current helix voltage of principal helix 63;
$v$ is the velocity modulation of the stream at the input end of principal helix 63; and
$i$ is the current modulation of the stream at the input end of principal helix 63.
$v$ and $i$ are given by the relationships $$v(jU_{so}Cs/n) = \frac{V_{1so}}{q_{1s}} + \frac{V_{2so}}{q_{2s}} + \frac{V_{3so}}{q_{3s}} \quad (12)$$

$$i\left(\frac{-2V_{so}C_s^2}{I_o}\right) = \frac{V_{1so}}{q_{1s}^2} + \frac{V_{2so}}{q_{2s}^2} + \frac{V_{3so}}{q_{3s}^2} \quad (13)$$

where $V_{1so}$, $V_{2so}$ and $V_{3so}$ are the magnitudes of $V_{1s}$, $V_{2s}$ and $V_{3s}$, respectively at the input end of principal helix 63. Substituting Equations 12 and 13 into Equation 11, for computation purposes it has been found desirable to solve for $$\frac{V_{1pi}}{V_{is}}$$

Reviewing the terms of Equations 11, 12, and 13, it can be seen that the variables are $V_{so}$, $V_{1so}$, $V_{2so}$ and $V_{3so}$. All of these quantities vary with $Z_s$ or $(CN)_s$, since $W_eC_sZ_s = 2\pi(CN)_s$ of input helix 62, and with $b_s$. In order to determine the optimum length and direct-current operating voltage range of the input helix, a group of curves were plotted with $$\frac{V_{1pi}}{V_{is}}$$

as a function of $b_s$ for several conditions of $(CN)_s$. The value of the maximum rate of change of $$\frac{V_{1pi}}{V_{is}}$$

with respect to $b_s$ where $$F = \left[\frac{\partial\left(\frac{V_{1pi}}{V_{is}}\right)}{\partial b_s}\right]_{max}$$

on each curve was then plotted as a function of (CN). This is shown in Fig. 8 where F reaches a maximum at $(CN)_s = (CN)_m$. This value of $(CN)_s$ gives the optimum length of the input helix 62. The effective dynamic range of gain control can be determined from a curve of $$\frac{V_{1pi}}{V_{is}}$$

in decibels as a function of $b_s$ for $(CN)_s = (CN)_m$. This is illustrated in Fig. 9 where the range of $b_s$ determining the direct-current voltage range of input helix 62 is given by $b_{ss} < b_s < b_{se}$. It is to be noted that $b_{ss}$ is substantially greater than −1 and that $b_{se}$ is substantially less than +1. The dynamic range of the modulator of the present invention may therefore be nearly 20 decibels for small changes in $b_s$. This may favorably result in 100 percent modulation of some traveling-wave tubes.

What is claimed is:

1. A traveling-wave tube amplifier comprising an electron gun for producing an electron stream, means for directing said stream along a predetermined path, a collector electrode disposed opposite said electron gun to intercept the stream electrons, an input helix disposed about said path adjacent said electron gun for propagating an electromagnetic wave at a predetermined velocity, said predetermined velocity being small in comparison to the velocity of light, a principal helix substantially longer than and contrawound with respect to and disposed between said input helix and said collector electrode for propagating said wave at substantially the same velocity as said predetermined velocity, means for maintaining said principal helix at a direct-current potential to produce maximum amplification of said wave, and means for maintaining said input helix within such a direct-current potential range as to produce a maximum change in the ratio of the output signal voltage to the input signal voltage in response to variations of the direct-current potential applied to said input helix.

2. A microwave tube comprising an evacuated envelope, means for producing an electron stream along a predetermined path within said envelope, an input conductive helix disposed about said path for propagating an electromagnetic wave at a predetermined velocity, said predetermined velocity being small in comparison to the velocity of light, said input helix having such a length that a maximum rate of change of the output signal amplitude with respect to the velocity of said electron stream in said input helix may be produced in response to variations of the direct-current potential applied to said input helix, a principal helix disposed sequentially along said path for propagating said wave at substantially the same velocity as said predetermined velocity, said principal helix having a length large in comparison to that of said input helix, coupling helix means contrawound with respect to said input and principal helices and disposed intermediate said input and principal helices for coupling electromagnetic wave energy from said input helix to said principal helix, and means for maintaining said principal helix at a potential different from that of said input helix.

3. A traveling-wave tube amplifier comprising an evacuated envelope, means for producing an electron stream along a predetermined path within said envelope, an input conductive helix having such a length that a maximum change in an output signal voltage with respect to the velocity of said stream in said input helix may be produced in response to variations of the direct-current potential applied to said input helix, said input helix being disposed about said path for propagating an electromagnetic wave at a predetermined velocity, said predetermined velocity being substantially less than the velocity of light, a principal helix disposed sequentially along said path for propagating said wave at substantially the same velocity as said predetermined velocity, a contrawound helical conductor disposed externally of and intermediate said input helix and said principal helix for coupling electromagnetic wave energy from said input helix to said principal helix, means for maintaining said principal helix at a potential to produce maximum amplification of said wave, and means for maintaining said input helix within such a potential range as to produce a maximum change in the output signal voltage in response to variations of the direct-current potential applied to said input helix.

4. A traveling-wave tube amplifier comprising an evacuated envelope, an electron gun disposed at one end of said envelope for producing an electron stream, means for directing said stream along a predetermined path, a collector electrode disposed at the opposite end of said envelope for intercepting said stream electrons, an input helix disposed about said path adjacent said electron gun for propagating an electromagnetic wave at a predetermined velocity, said predetermined velocity being small in comparison to the velocity of light, a principal helix disposed sequentially along said path for propagating said wave at a velocity approximately equal to said predetermined velocity, said principal helix being substantially longer than said input helix, contrawound coupling helix means for coupling said electromagnetic wave from said input helix to said principal helix, means for maintaining said principal helix at a direct-current potential to produce a maximum gain of said wave, and means for maintaining said input helix within such a direct-current potential range as to produce a maximum change in the output signal voltage with respect to the velocity of said electron stream within said input helix in response to variations of the direct-current potential applied to said input helix.

5. A traveling-wave tube modulator comprising: an evacuated envelope; an electron gun disposed at one end of said envelope for developing an electron stream; an input conductive helix disposed about said stream adjacent said electron gun for propagating an electromagnetic wave; a principal conductive helix disposed sequentially along said stream adjacent said input helix; contrawound coupling helix means for coupling electromagnetic energy from said input helix to said principal helix, means for maintaining said input helix at a quiescent potential such that in response to variations in the direct-current potential applied to said input helix, the rate of change of the output signal amplitude of said tube with respect to the velocity of said stream within said input helix is a maximum, means for maintaining said principal helix at a potential to produce maximum gain of said wave, and means connected to said input helix for modulating the voltage of said input helix to change the velocity of said stream, whereby the amplitude of said electromagnetic wave is varied independently of its phase.

6. A traveling-wave tube amplifier comprising an evacuated envelope, means for producing an electron stream along a predetermined path within said envelope, an input conductive helix having such a length that a maximum change in an output signal voltage with respect to the velocity of said stream in said input helix may be produced in response to variations of the direct-current potential applied to said input helix, said input helix being disposed about said path for propagating an electromagnetic wave at a predetermined velocity, said predetermined velocity being substantially less than the velocity of light, a principal helix disposed sequentially along said path for propagating said wave at substantially the same velocity as said predetermined velocity, a contrawound helical conductor disposed externally of and intermediate said input helix and said principal helix for coupling electromagnetic wave energy from said input helix to said principal helix, means for maintaining said principal helix at a potential to produce maximum amplification of said wave, means for maintaining said input helix within such a potential range as to produce a maximum change in the output signal voltage in response to variations of the direct-current potential applied to said input helix, and means for maintaining said input helix at a positive direct-current potential proportional to the envelope of an output signal of said tube.

References Cited in the file of this patent

UNITED STATES PATENTS

| | | |
|---|---|---|
| Re. 23,647 | Lindenblad | Apr. 21, 1953 |
| 2,541,843 | Tiley | Feb. 13, 1951 |
| 2,584,597 | Landauer | Feb. 5, 1952 |
| 2,588,832 | Hansell | Mar. 11, 1952 |
| 2,611,832 | Lapostolle | Sept. 23, 1952 |
| 2,616,990 | Knol et al. | Nov. 4, 1952 |
| 2,636,948 | Pierce | Apr. 28, 1953 |
| 2,689,887 | Doehler | Sept. 21, 1954 |

FOREIGN PATENTS

| | | |
|---|---|---|
| 979,094 | France | Dec. 6, 1950 |

UNITED STATES PATENT OFFICE

Certificate of Correction

Patent No. 2,869,022 January 13, 1959

George R. Brewer

It is hereby certified that error appears in the printed specification of the above numbered patent requiring correction and that the said Letters Patent should read as corrected below.

Column 5, lines 49 to 50 inclusive, for the equation reading "$j=(1)^{1/2}$" read —$j=(-1)^{1/2}$—; column 6, line 37, for "travel-wave" read —traveling-wave—.

Signed and sealed this 19th day of May 1959.

[SEAL]

Attest:

KARL H. AXLINE,

*Attesting Officer.*

ROBERT C. WATSON,

*Commissioner of Patents.*